(No Model.) 2 Sheets—Sheet 1.
H. D. REESE & M. F. GAME.
SEED PLANTER.
No. 427,612. Patented May 13, 1890.
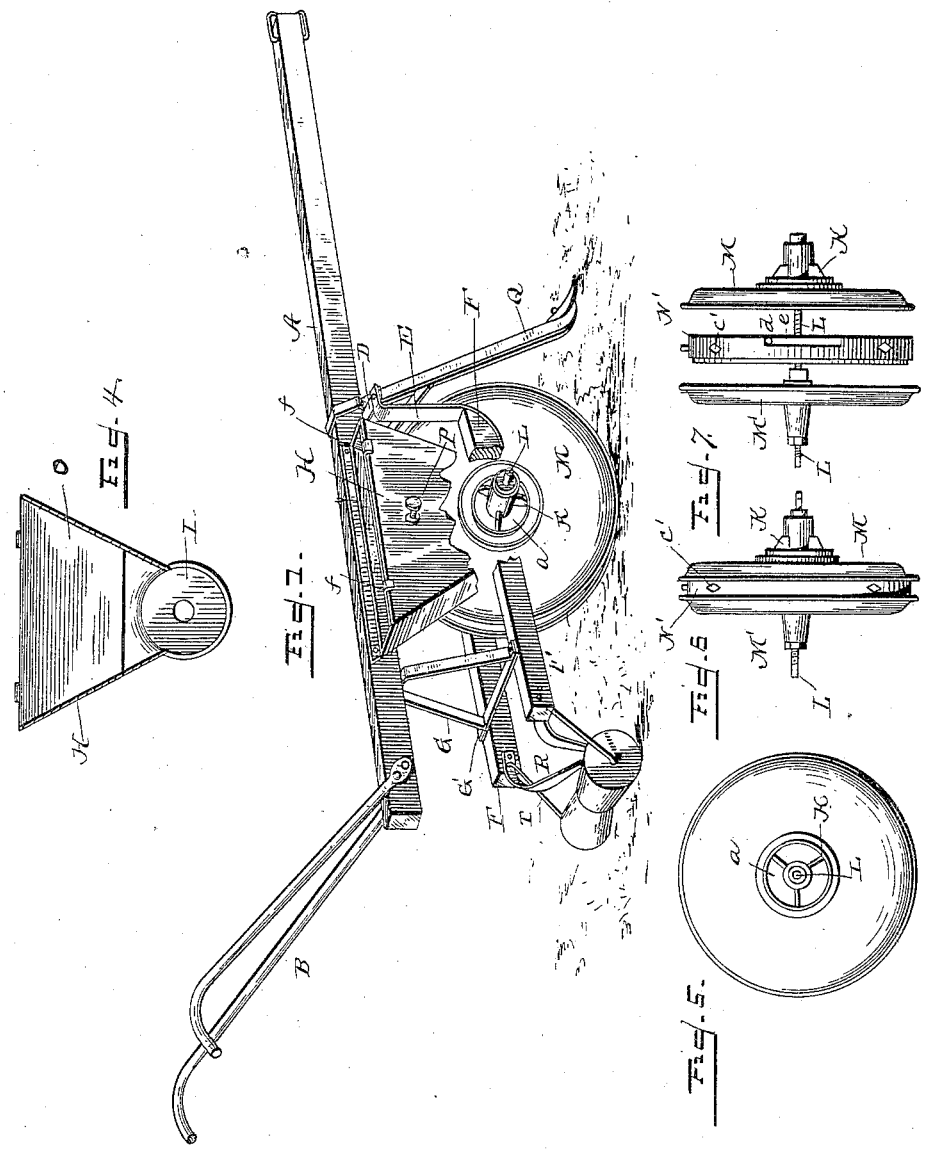

(No Model.) 2 Sheets—Sheet 2.
H. D. REESE & M. F. GAME.
SEED PLANTER.
No. 427,612. Patented May 13, 1890.
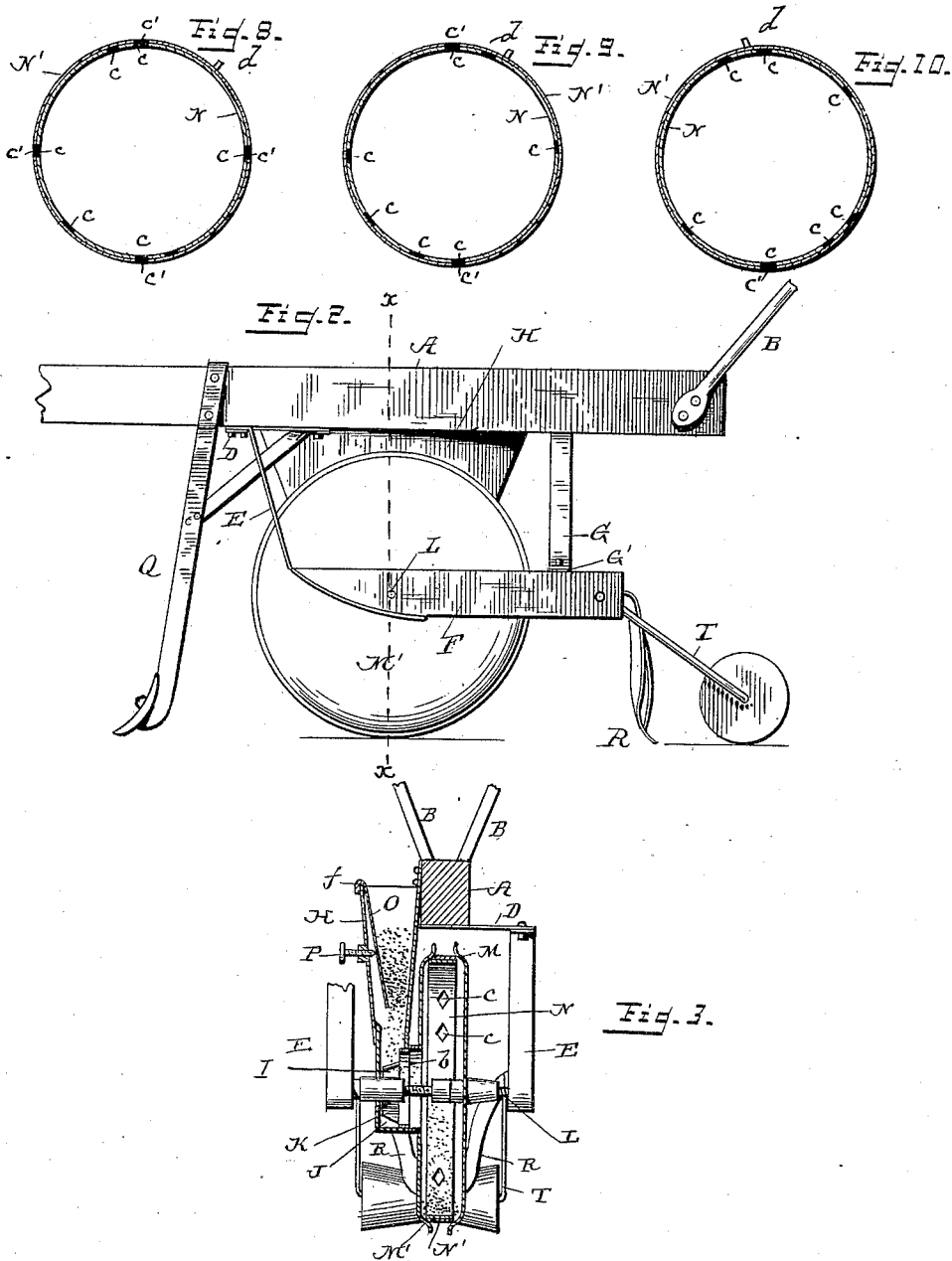

UNITED STATES PATENT OFFICE.

HENRY DOBSON REESE AND MORGAN F. GAME, OF ABBEVILLE, SOUTH CAROLINA.

SEED-PLANTER.

SPECIFICATION forming part of Letters Patent No. 427,612, dated May 13, 1890.

Application filed December 6, 1889. Serial No. 332,771. (No model.)

*To all whom it may concern:*

Be it known that we, HENRY DOBSON REESE and MORGAN F. GAME, citizens of the United States, residing at Abbeville, in the county of Abbeville and State of South Carolina, have invented certain new and useful Improvements in Seed-Planters; and we do hereby declare the following to be a full, clear, and exact description of the invention, such as will enable others skilled in the art to which it appertains to make and use the same.

Our invention relates to seed-planters for dropping seeds of various kinds and such materials as may be fed through or distributed by the machine, and has for its objects, among other things, to provide for regulating the distance apart which the seed or material shall be dropped, so that it may be dropped at greater or less distances, as may be desired, or, if desired, may be dropped continuously; also, to provide for increasing or decreasing the width of the seed or material holding hopper, so that more or less material may be held therein within desired limits or its feed therefrom brought under control; also, generally to simplify and improve the construction of parts by means whereof the ground is opened, a channel is formed to receive the material or seed, which is dropped in regulated quantities or not, as desired, and which is then covered and the soil rolled; and to the accomplishment of such ends the invention consists in the construction and combination of parts hereinafter particularly described and claimed, reference being had to the accompanying drawings, forming a part hereof.

Figure 1 is a perspective of the seed-planter with portion of hopper and side bar broken away. Fig. 2 is a side view, on an enlarged scale, with forward part of beam broken away. Fig. 3 is a cross-section through line $x\ x$ of Fig. 2, with side bars in full lines. Fig. 4 is a vertical section of hopper. Fig. 5 is a side elevation of revolving chamber. Fig. 6 is an end view of revolving chamber, and Fig. 7 is a similar view of same with parts separated. Figs. 8, 9, and 10 are vertical sections through band of revolving chamber with openings in different positions.

In the drawings, the letter A designates the beam, provided with the handles B and resting at one point upon the cross-bar D, connected by the arms E to the side bars F, and at another point upon the braces G, connected at their lower ends to the side bars F, or to a transverse bar G, connecting said side bars.

To one side of the beam A is secured a hopper H, which has preferably converging sides and ends, and the lower portion of which is preferably contracted and then enlarged so as to form a chamber I below the exit-opening J in the lower portion of the hopper, in which chamber revolves blades K, secured to a shaft L passing through the chamber and journaled in the side bars F. This shaft also carries a concave plate or disk M, which fits close enough to the side of the hopper to close an opening $a$ therein except where said opening communicates with a corresponding opening $b$ in the side of the concave plate or disk, and the blades K, which fit in the chamber I, extend through the opening $a$ into the opening $b$, and preferably taper or narrow from their ends next to the opening $b$ to their opposite ends, so that the material or seed passing from the hopper into the chamber I will be fed by the blades through opening $b$ into the chamber formed by the disk or plate M and a companion plate or disk M′, secured to the same shaft L which carries the other plate M. As the two plates or disks M and M′ revolve with the shaft which carries the blades K, it is apparent that the material or seed fed from the hopper to the chamber formed by the two plates or disks will be continuously agitated, and so that it will be impossible for the same to choke or form into a solid or compact mass. Both of the disks or plates being concave, their peripheries form a bottom to the chamber, and the two edges of the opposite plates being at a distance from each other, a continuous open space or channel is formed completely around the chamber; and in order that the width of this channel may be increased or lessened, as desired or occasion requires, at least one of the plates is made adjustable on the shaft in some suitable way—for instance, by screw-threading the shaft and screwing the plate M′ thereon. This chamber can be used with the periph- (No Model.)
F. D. RETTICH.
PUZZLE.
No. 427,613. Patented May 13, 1890.
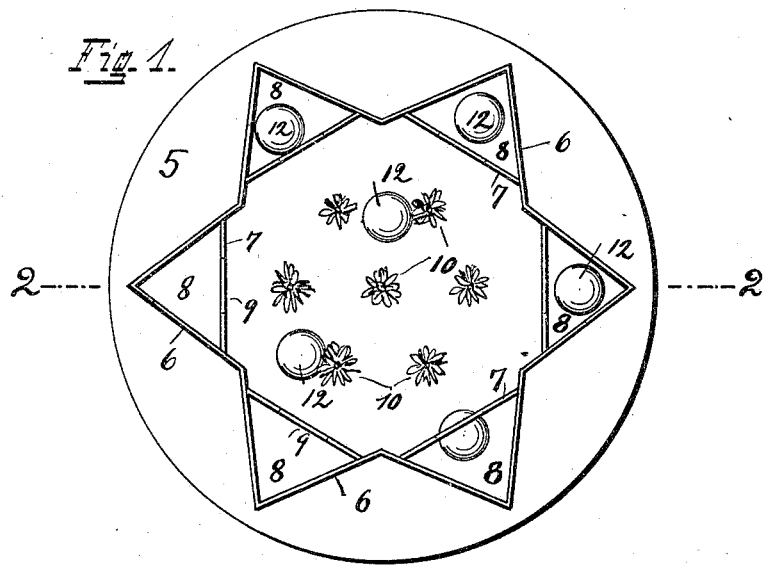
Fig. 1.
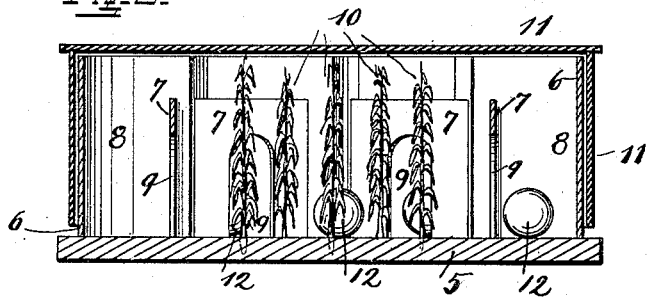
Fig. 2.
Fig. 3.
Cows are in the Corn
Puzzle
Drive the Cows (Marbles) out from the Corn into their Stalls.
Attest
Harry Oemke
Paul Laur
Inventor
Frank D. Rettich
by Carl Spengel his Atty.